(12) United States Patent
Hayes et al.

(10) Patent No.: US 8,965,539 B2
(45) Date of Patent: Feb. 24, 2015

(54) SYSTEM AND METHOD FOR A DEMAND DRIVEN LEAN PRODUCTION CONTROL SYSTEM

(75) Inventors: Timothy R. Hayes, Mckinney, TX (US); Aamer Rehman, Flower Mound, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 882 days.

(21) Appl. No.: 12/565,348

(22) Filed: Sep. 23, 2009

(65) Prior Publication Data

US 2010/0083160 A1 Apr. 1, 2010

Related U.S. Application Data

(60) Provisional application No. 61/100,713, filed on Sep. 27, 2008.

(51) Int. Cl.
*G06F 3/048* (2013.01)
*G05B 19/418* (2006.01)

(52) U.S. Cl.
CPC *G05B 19/41865* (2013.01); *G05B 2219/31378* (2013.01); *G05B 2219/32268* (2013.01); *Y10S 715/965* (2013.01)
USPC ............ 700/83; 700/100; 700/106; 705/7.23; 715/965

(58) Field of Classification Search
CPC ............... G05B 19/41865; G05B 2219/31378; G05B 2219/32268; G05B 2219/23258; G05B 2219/25067; G06Q 10/06; G06Q 10/0633; G06Q 10/08; G06Q 10/087; G06F 3/048
USPC ............................. 700/83, 95–102, 106–111; 705/7.11–7.27, 28, 29; 706/902–904, 706/906; 715/733–737, 961–970
See application file for complete search history.

(56) References Cited

U.S. PATENT DOCUMENTS 4,827,423 A 5/1989 Beasley et al.
5,040,123 A * 8/1991 Barber et al. ............ 700/100

(Continued)

FOREIGN PATENT DOCUMENTS

CN 1614527 5/2005
GB 2437757 7/2007

(Continued)

OTHER PUBLICATIONS

Aluskan, Aziz Batur. "Emulated Flexible Manufacturing Facility." Thesis. University of Florida, 1999. Citeseerx.ist.psu.edu. PSU—College of Information Sciences & Technology. 100 pgs. Web. Feb. 6, 2013.*

(Continued)

*Primary Examiner* — M N Von Buhr
(74) *Attorney, Agent, or Firm* — Jackson White, PC; Steven J. Laureanti

(57) ABSTRACT

A system and method is disclosed providing visualization of a production control framework. The system includes a storage medium stored therein one or more user interfaces providing a visual representation of one or more graphical elements representing one or more entities, the one or more entities comprising one or more work centers, wherein the one or more work centers each comprise one or more user interfaces. The system further includes a storage medium stored therein a job queue display within the one or more user interfaces and a plurality of tasks for each of a plurality of parts produced by the one or more entities.

20 Claims, 5 Drawing Sheets

(56) References Cited

U.S. PATENT DOCUMENTS

| | | | |
|---|---|---|---|
| 5,093,794 A | 3/1992 | Howie et al. | |
| 5,369,570 A * | 11/1994 | Parad | 705/7.13 |
| 5,596,502 A | 1/1997 | Koski et al. | |
| 5,612,886 A * | 3/1997 | Weng | 700/101 |
| 5,835,898 A * | 11/1998 | Borg et al. | 705/7.12 |
| 5,993,041 A * | 11/1999 | Toba | 700/99 |
| 6,078,900 A | 6/2000 | Ettl et al. | |
| 6,236,901 B1 * | 5/2001 | Goss | 700/95 |
| 6,396,516 B1 * | 5/2002 | Beatty | 715/764 |
| 6,714,830 B2 * | 3/2004 | Browning | 700/102 |
| 6,785,581 B2 * | 8/2004 | Mountcastle et al. | 700/96 |
| 6,957,113 B1 | 10/2005 | Logsdon et al. | |
| 7,020,594 B1 * | 3/2006 | Chacon | 703/6 |
| 7,039,595 B1 * | 5/2006 | Lilly et al. | 705/7.25 |
| 7,043,319 B1 | 5/2006 | Logsdon et al. | |
| 7,065,567 B1 * | 6/2006 | Squires et al. | 709/223 |
| 7,184,850 B1 | 2/2007 | Logsdon et al. | |
| 7,184,967 B1 * | 2/2007 | Mital et al. | 705/7.26 |
| 7,236,844 B1 | 6/2007 | Bai et al. | |
| 7,324,966 B2 | 1/2008 | Scheer | |
| 7,337,032 B1 | 2/2008 | Nettles et al. | |
| 7,379,206 B2 | 5/2008 | Gartstein et al. | |
| 7,463,939 B1 | 12/2008 | Mata et al. | |
| 7,499,766 B2 | 3/2009 | Knight et al. | |
| 7,660,641 B2 * | 2/2010 | Bournas et al. | 700/95 |
| 7,904,192 B2 * | 3/2011 | Chua et al. | 700/100 |
| 7,941,236 B2 | 5/2011 | Spearman | |
| 8,014,991 B2 | 9/2011 | Mitrovic et al. | |
| 8,108,989 B2 * | 2/2012 | Muhlenkamp et al. | 29/794 |
| 8,121,716 B2 * | 2/2012 | Offenmuller | 700/97 |
| 8,170,946 B2 * | 5/2012 | Blair et al. | 705/37 |
| 8,209,205 B1 * | 6/2012 | McElroy et al. | 705/7.12 |
| 8,249,906 B2 * | 8/2012 | Ponce de Leon | 705/7.18 |
| 2002/0007289 A1 * | 1/2002 | Malin et al. | 705/4 |
| 2002/0055804 A1 | 5/2002 | Betawar et al. | |
| 2002/0161940 A1 | 10/2002 | Eryurek et al. | |
| 2003/0014314 A1 * | 1/2003 | Griep et al. | 705/15 |
| 2003/0229550 A1 | 12/2003 | DiPrima et al. | |
| 2004/0034555 A1 * | 2/2004 | Dismukes et al. | 705/7 |
| 2004/0148047 A1 * | 7/2004 | Dismukes et al. | 700/100 |
| 2004/0153187 A1 * | 8/2004 | Knight et al. | 700/99 |
| 2005/0209732 A1 | 9/2005 | Audimoolam et al. | |
| 2005/0234579 A1 * | 10/2005 | Asmundsson et al. | 700/102 |
| 2006/0235557 A1 * | 10/2006 | Knight et al. | 700/103 |
| 2008/0066019 A1 * | 3/2008 | Worek et al. | 715/965 |
| 2008/0092057 A1 * | 4/2008 | Monson et al. | 715/744 |
| 2009/0099887 A1 | 4/2009 | Sklar et al. | |
| 2009/0248431 A1 | 10/2009 | Schoknecht et al. | |
| 2010/0010856 A1 | 1/2010 | Chua et al. | |

FOREIGN PATENT DOCUMENTS

| | | |
|---|---|---|
| GB | 2463794 A | 3/2010 |
| GB | 2463795 A | 3/2010 |
| TW | 200834273 | 8/2008 |
| TW | 200836033 | 9/2008 |
| TW | I301567 | 10/2008 |
| WO | WO 0017774 | 3/2000 |
| WO | WO 0020939 | 4/2000 |

OTHER PUBLICATIONS

Bing, Khoo Boon. "Development and Application of a Web-Based Kanban System." Thesis. National University of Singapore, 2004. Scholarbank.nus.edu.sg. National University of Singapore. 78 pgs. Web. Feb. 6, 2013.*

Kreipl. S. et al. "Coordination Issues in Supply Chain Planning and Scheduling." Handbook of Production Scheduling. Herrmann, Jeffrey W. (ed.). Springer Science+Business Media, Inc., USA. 2006. pp. 177-212. Web Feb. 6, 2013.*

Search Report for Taiwan Invention Patent Application No. 098132588; May 28, 2014; p. 1.

Search Report for Taiwan Invention Patent Application No. 098132589; Jul. 16, 2014; p. 1.

* cited by examiner

Six  
○ Application: Lean Lifecycle Management > Execution > Operator Dashboard  
User: MOLD_01 Operator    Log Out | Help | About  
edit  
Queue | Setup | Ring  
Monday 04/01/07    Refresh Min: 5   3:05

| Position 1 | Position 2 | Position 3 | Position 4 |
|---|---|---|---|
| PL-MOLD 02 | SS-MOLD 02 | RB-MOLD 02 | PL-MOLD 01 |

MOLD_01

410 — Job Queue

| Setup | Tool | Part ID | Part Name | SP | DOC | BOH |
|---|---|---|---|---|---|---|
| SS-MOLD 02 | HNDL-SS3 | HNDL-SS3 | Red UFD Trim | 50 | 1.0 | 480 |
| PL-MOLD 01 | HNDL-PL5 | HNDL-PL5 | Black PCX Trim | 50 | 1.2 | 400 |
| RB-MOLD 02 | HNDL-RB3 | HNDL-RB3 | Grey UFD Trim | 30 | 1.0 | 22 |
| PL-MOLD 02 | HNDL-RB5 | HNDL-SS5 | Black UFD Trim | 50 | 0.8 | 3 |
| SS-MOLD 02 | HNDL-SS3 | HNDL-RB5 | Red UFE Trim | 30 | 1.0 | 12 |
| PL-MOLD 02 | HNDL-RB5 | HNDL-RB5 | Black UFD Trim |  |  |  |
| SS-MOLD 02 | HNDL-SS3 | HNDL-SS3 | Red UFD Trim |  |  |  |

416  419  414  413  415

| Setup | Tool | Part ID | Part Name | SP | DOC | BOH | P | TRG | INV | KB | MT | GW | Status |
|---|---|---|---|---|---|---|---|---|---|---|---|---|---|
|  |  |  |  | 30 | 2.2 | 150 | 7 | 4 | ✓ | 4 | 2 | ✓ | Running |
|  |  |  |  | 50 | 2.2 | 350 | 6 | 7 | ✓ | 6 | 5 | ✓ |  |
|  |  |  |  | 40 | 1.9 | 200 | 5 | 8 | ✓ | 3 | ✓ | ✓ |  |
|  |  |  |  | 50 | 1.3 | 400 | 4 | 8 | ✓ | 7 | ✓ | ✓ |  |
|  |  |  |  | 30 | 1.2 | 120 | 3 | 4 | ✓ | ✓ | ✓ | ✓ |  |
|  |  |  |  | 50 | 1.2 | 400 | 2 | 8 | ✓ | ✓ | ✓ | ✓ |  |
|  |  |  |  | 30 | 1.1 | 120 | 1 | 4 | ✓ | ✓ | ✓ | ✓ |  |

411 421  420a 420b 420c 420d  NTag Filter ☑ 418

412

| Setup | Tool | Part ID | Part Name | RUN | Pace | Start | End | Status |
|---|---|---|---|---|---|---|---|---|
| PL-MOLD 02 | HNDL-RB5 | HNDL-RB5 | Black UFD Trim | 00:01 |  | 04/01 09:07:44 |  | Running |
| PL-MOLD 02 | HNDL-RB5 | HNDL-SS3 | Black UFD Trim | 02:12 | .97 | 04/01 09:05:30 | 04/01 09:07:45 | On Time |
| SS-MOLD 02 | HNDL-SS3 | HNDL-SS3 | Red UFD Trim | 04:23 | 1.05 | 04/01 09:02:23 | 04/01 09:05:30 | On Time |
| SS-MOLD 02 | HNDL-SS3 | HNDL-SS3 | Green PCX Trim | 03:16 | 0.90 | 04/01 09:01:45 | 04/01 09:02:22 | Fast |
| SS-MOLD 02 | HNDL-SS3 | HNDL-SS3 | Red UFD Trim | 05:02 | 1.26 | 04/01 09:00:05 | 04/01 09:01:44 | Slow |

REFRESH  09:08:01        0  435    PAUSE  432   CONWIP  434   START  431   DONE  433

SYSTEM AND METHOD FOR A DEMAND DRIVEN LEAN PRODUCTION CONTROL SYSTEM

CROSS-REFERENCE TO RELATED APPLICATIONS

The present invention is related to that disclosed in U.S. Provisional Patent Application Ser. No. 61/100,713, filed 27 Sep. 2008, entitled "DMK: An Advanced Demand Driven Lean Production Control System." U.S. Provisional Patent Application Ser. No. 61/100,713 is assigned to the assignee of the present application. The subject matter disclosed in U.S. Provisional Patent Application Ser. No. 61/100,713 is hereby incorporated by reference into the present disclosure as if fully set forth herein. The present invention hereby claims priority under 35 U.S.C. §119(e) to U.S. Provisional Patent Application Ser. No. 61/100,713.

TECHNICAL FIELD OF THE INVENTION

This invention relates generally to production control systems, and more particularly to a system and method for a demand driven lean production control system.

BACKGROUND OF THE INVENTION

In a traditional lean manufacturing environment, a kanban card system (e.g., a physical card) is used as a means to control the production flow on a manufacturing floor. The kanban card system is typically referred to as a pull signal, because the kanban card is attached to a container of parts which travels around the manufacturing floor. When the container is empty, the empty container and the kanban card arrive back at a production resource to refill the container, as component supplies and manufacturing capacity permit.

In an effort to overcome the above-discussed deficiencies, a manufacturing entity is required to hold higher or excessive inventories. However, increasing inventory without a forward looking mechanism is unresponsive to real-time demand. In addition, because the kanban card system is backward looking a manufacturing entity is inherently exposed to constraints and bottlenecks on the manufacturing floor. This inability to provide a forward looking production control mechanism is undesirable.

SUMMARY OF THE INVENTION

A system providing visualization of a production control framework is disclosed. The system includes a storage medium stored therein one or more user interfaces providing a visual representation of one or more graphical elements representing one or more entities, the one or more entities comprising one or more work centers, wherein the one or more work centers each comprise one or more user interfaces. The system further includes a storage medium stored therein a job queue display within the one or more user interfaces and a plurality of tasks for each of a plurality of parts produced by the one or more entities.

A method providing visualization of a production control framework is disclosed. The method provides one or more user interfaces representing one or more entities, the one or more entities comprising one or more work centers, wherein the one or more work centers each comprise one or more user interfaces. The method further provides a job queue display within the one or more user interfaces and a plurality of tasks for each of a plurality of parts produced by the one or more entities in the job queue display.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 4 illustrates an operator dashboard interface provided at each work center of FIG. 3;

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
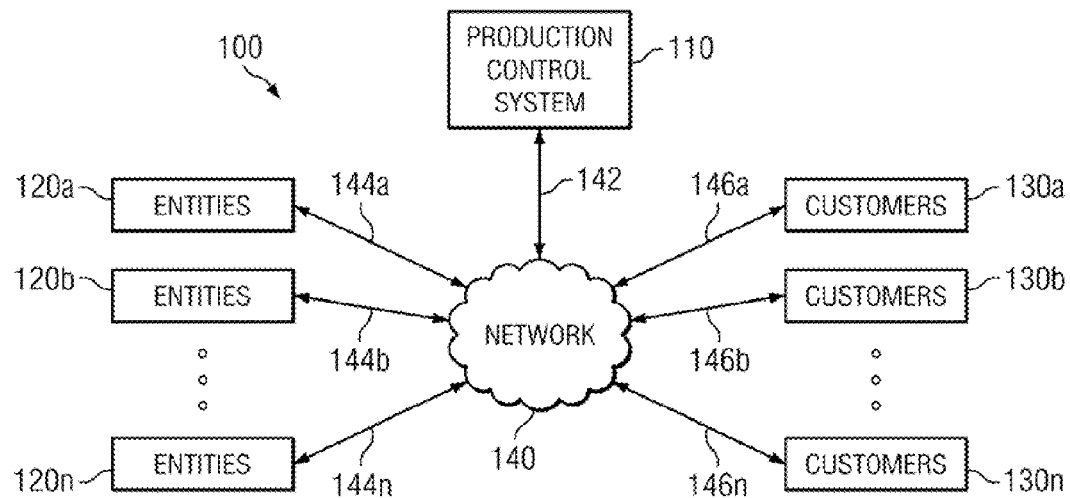
FIG. 1 illustrates an exemplary supply chain network according to a preferred embodiment.

FIG. 1 illustrates an exemplary supply chain network 100 according to a preferred embodiment. Supply chain network 100 comprises a production control system 110, one or more entities 120a-120n, one or more customers 130a-130n, a network 140, and communication links 142, 144a-144n and 146a-146n. Although a single production control system 110, one or more entities 120a-120n, and one or more customers 130a-130n, are shown and described, embodiments contemplate any number of production control systems 110, any number of entities 120a-120n and/or any number of customers 130a-130n, according to particular needs. In addition, or as an alternative, one or more other entities 120a-120n may be, for example, manufacturing entities, manufacturing processes, production facilities, and other like entities. In addition, production control system 110 may be integral to or separate from the hardware and/or software of any one of one or more entities 120a-120n.

In one embodiment, supply chain network 100 models a production control technique for, items, products, parts, materials, goods, and/or services through one or more entities 120a-120n based on demand received from one or more other entities 120a-120n and/or one or more customers 130a-130n. As described below in more detail, production control system 110 utilizes three types of production control authorizations: DTag production control signals, MTag production control signals and kanban production control signals (i.e., authorizing pull-based production of a standard pack (i.e., incremental (smallest) production quantity of an item). In one embodiment, a DTag production control signal is a demand authorization introduced into production control system 110 via a BOM explosion for all produced parts required to satisfy a demand whenever that demand is introduced into the production control system 110. For example, the demand may come from a pacemaker operation, and/or, for items that are not scheduled on pacemaker operations, directly from either one or more customers 130a-130n or an increase of one or more finished good target inventories.

In another embodiment, an MTag production control signal is either work center-specific or non-work center-specific (a work center set of one or more production resources, indistinguishable and acting as one for planning purposes). The number of work center-specific MTags, defined at a work center-pair level and specifying both a consuming work center and a producing work center, represents the maximum amount of inventory present at a destination work center which was produced at a particular source (producing) work center. In addition, the non-work center-specific MTags are required for production of any part consuming raw material. In an embodiment, the number of MTags and kanban present in production control system 110 may be fixed at a predetermined level to achieve optimal product flow and inventory levels within one or more entities 120a-120n. In addition, the number of MTags and kanban for each part represents the maximum amount of inventory present in the system for that particular part at a specific time period.

In one embodiment, supply chain network 100 may operate on one or more computers that may be integral to, or separate from, the hardware and/or software that support production control system 110, one or more entities 120a-120n, and one or more customers 130a-130n. These one or more computers may include any suitable input device, such as a keypad, mouse, touch screen, microphone, or other device to input information. In addition, these one or more computers may include any suitable output device that may convey information associated with the operation of supply chain network 100, including digital or analog data, visual information, or audio information. Furthermore, these one or more computers may include fixed or removable computer-readable storage media, such as magnetic computer disks, CD-ROM, or other suitable media to receive output from and provide input to supply chain network 100. In addition, these one or more computers may include one or more processors and associated memory to execute instructions and manipulate information according to the operation of supply chain network 100.

In addition, or as an alternative, production control system 110, one or more entities 120a-120n, and/or one or more customers 130a-130n may each operate on one or more separate computers or may operate on one or more shared computers. Each of these one or more computers may be a work station, personal computer (PC), network computer, personal digital assistant (PDA), wireless data port, or any other suitable computing device. In another embodiment, one or more users may be associated with one or more entities 120a-120n and/or one or more customers 130a-130n. These one or more users may include, for example, "planners," "operators," and/or "plant managers" handling production control systems, requirements, procedures and policies within supply chain network 100. In addition, or as an alternative, these one or more users may include, for example, one or more computers programmed to autonomously handle production control systems, requirements, procedures and policies within supply chain network 100.

In one embodiment, production control system 110 may be coupled with network 140 using communications link 142, which may be any wireline, wireless, or other link suitable to support data communications between production control system 110 and network 140 during operation of supply chain network 100. One or more entities 120a-120n may be coupled with network 140 using communications link 144a-144n, which may be any wireline, wireless, or other link suitable to support data communications between one or more entities 120a-120n and network 140 during operation of supply chain network 100. One or more customers 130a-130n may be coupled with network 140 using communications links 146a-146n, which may be any wireline, wireless, or other link suitable to support data communications between one or more customers 130a-130n and network 140 during operation of supply chain network 100.

Although communication links 142, 144a-144n and 146a-146n are shown as generally coupling production control system 110, one or more entities 120a-120n, and one or more customers 130a-130n to network 140, production control system 110, one or more entities 120a-120n, and one or more customers 130a-130n may communicate directly with each other, according to particular needs. In addition, or as an alternative, production control system 110 may reside within one or more entities 120a-120n and/or one or more customers 130a-130n, according to particular needs.

In another embodiment, network 140 may include the Internet and any appropriate local area networks (LANs), metropolitan area networks (MANS), or wide area networks (WANs) coupling production control system 110, one or more entities 120a-120n, and one or more customers 130a-130n. Those skilled in the art will recognize that the complete structure and operation of communication network 140 and other components within supply chain network 100 are not depicted or described. Embodiments may be employed in conjunction with known communications networks and other components.

Figure 2:
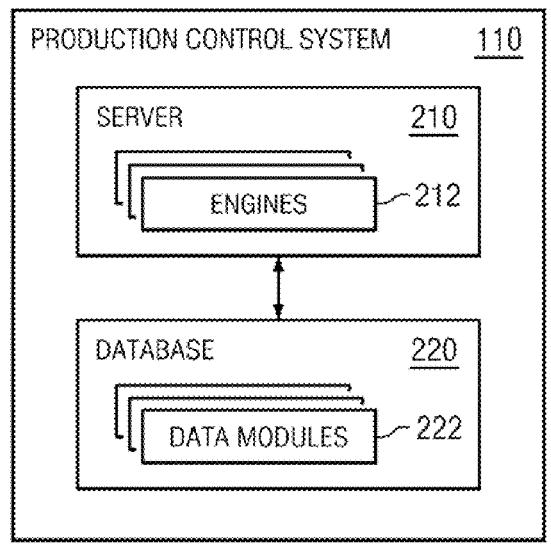
FIG. 2 illustrates the production control system of FIG. 1.

FIG. 2 illustrates production control system 110 of FIG. 1 in greater detail in accordance with the preferred embodiment. As discussed above, production control system 110 comprises one or more computers at one or more locations including associated input devices, output devices, computer-readable storage media, processors, memory, or other components for receiving, processing, storing, and communicating information according to the operation of supply chain network 100. In one embodiment, production control system 110 stores production control data associated with one or more entities 120a-120n and/or one or more customers 130a-130n, in database 220.

Server 210 comprises one or more engines 212, including a demand propagation engine. In addition, although server 210 is shown and described as comprising one or more engines 212, embodiments contemplate any suitable engine or combination of engines, according to particular needs. Database 220 comprises one or more databases or other data storage arrangements at one or more locations, local to, or remote from, server 210. Database 220 includes, for example, one or more data modules 222. As an example only and not by way of limitation, production control system 110 stores production control data associated with one or more entities 120a-120n and one or more customers 130a-130n that may be used by server 210, and in particular, by one or more engines 212.

Figure 3:
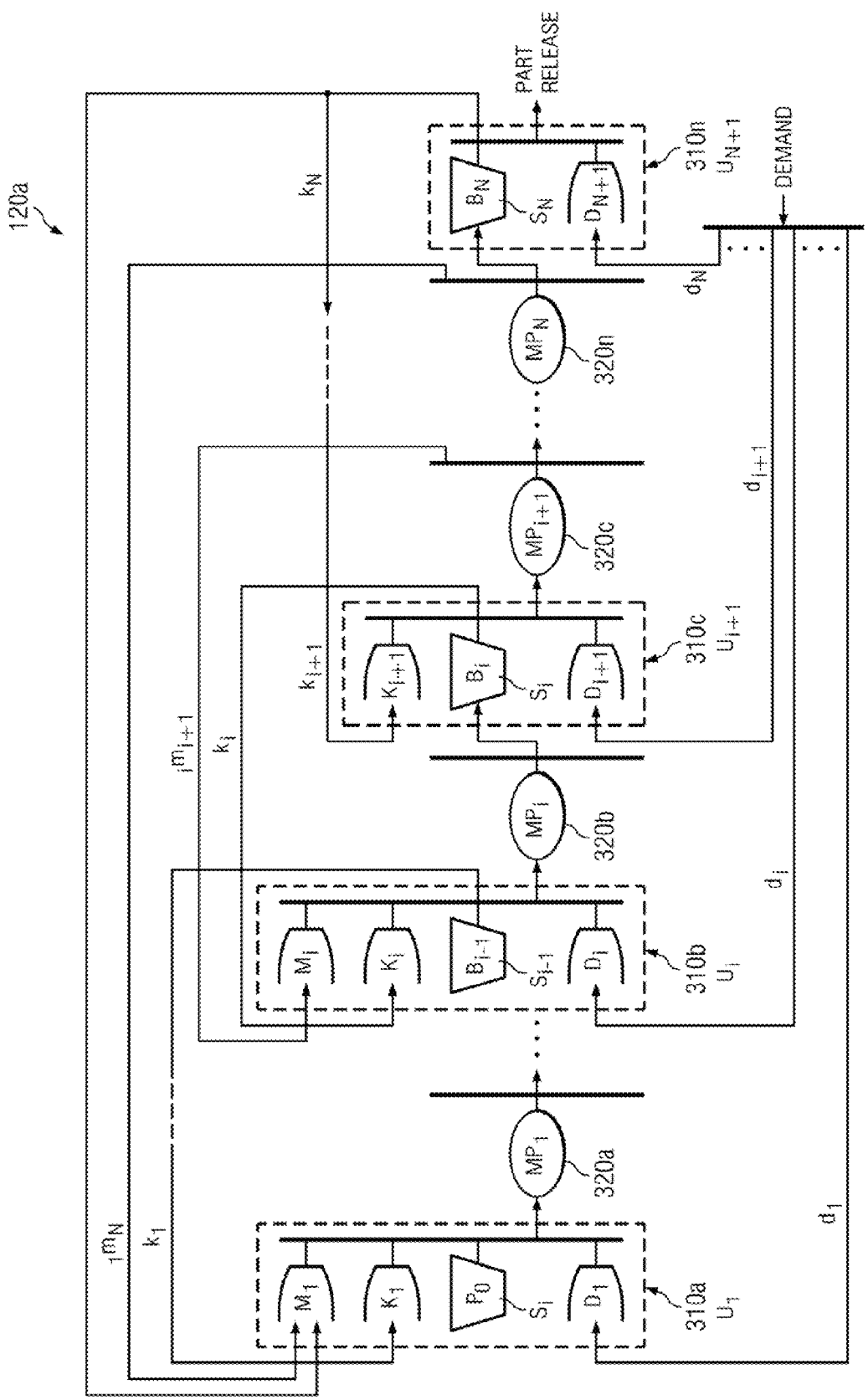
FIG. 3 illustrates an exemplary model of production environment of an entity of FIG. 1.

FIG. 3 illustrates an exemplary model of production environment of entity 120a of FIG. 1 in greater detail in accordance with the preferred embodiment. Entity 120a comprises a plurality of work centers 310a-310n and a plurality of manufacturing processes 320a-320n that produce one or more finished parts $P_N$. Entity 120a further comprises a plurality of production control variables, such as, for example, output buffer of stage i ($B_i$), demand queuing stage i ($D_i$), number of DTags in stage i ($d_i$), unique number identifying a production stage (i,j), kanban queuing station in stage i ($K_i$), number of kanban in stage i ($k_i$), MTag queuing station in stage i ($M_i$), MTag for producer i and consumer j ($_1m_N$=CONstant WIP) ($_im_j$), manufacturing process of stage i ($MP_i$), number of manufacturing stages (N), raw material buffer 0 feeding stage 1 ($P_0$), Max inventory of Bi ($s_i$), synchronization station at stage i ($U_i$). Although a plurality of work centers 310a-310n, a plurality of manufacturing processes 320a-320n, and a plurality of production control variables are shown and described, embodiments contemplate any number of work centers 310a-310n, any number of manufacturing processes 320a-320n and/or any number of production control variables, according to particular needs.

In one embodiment, each work center 310a-310n consumes part $P_{i-1}$ and produces part $P_i$ wherein work center 310a is stage 1 and consumes raw material $P_0$ with, for example, infinite supply. In another embodiment, each buffer $B_i$ has a target inventory of $s_i$ which is set to the sum of capacity buffer and production lead time buffer requirements, which "primes" the value stream with a buffer of high volume parts to improve, for example, system responsiveness.

As an example only, and not by way of limitation, whenever a new demand is received at entity 120a of FIG. 1 a demand kanban is generated by exploding the BOM for the demanded part and providing a demand kanban for each additional standard pack required of a component or finished good (i.e., a produced part that is shippable to one or more customers 130a-130n) part. When a demand kanban appears at a work center it is available to authorize replenishment production of the item, which begins when an empty kanban, as well as empty MTag or CMTag, if needed, is also present and Work Center capacity permits.

In addition, the DTag production control signal provides the functionality of extended kanban, which is a production control policy that results in fewer full kanban (less inventory) on average in the system than the standard kanban enables, since standard kanban authorize replenishment as soon as empty kanban arrive at the producing Work Center. The quantity of inventory required by extended kanban on average is less than that required without extended kanban by the quantity of inventory of the part represented by the sum of the number of kanban in the loop size in excess of that required by the current demand signal. Therefore the DTag production control signal provides for controlling excess production in environments where the demand volume and/or mix is variable.

In another embodiment, the MTag production control signal is a material authorization signal which provides the functionality of both Paired-cell Overlapping Loops of Cards with Authorizations (POLCA) production control policy and CONstant Work-In-Process (CONWIP) production control policy. POLCA enables management of capacity constrained work centers. For example, POLCA production control techniques constrain replenishment until a POLCA signal is available, which represents available capacity on a downstream work center. The POLCA signals are thus work center-specific, not part-specific, and specify a consuming (generally bottleneck) work center and a producing work center supplying parts to the consuming work center. When the consuming work center is ready to accept more work, which is generally as parts produced at the consuming work center are released to finished good or downstream processes, POLCA signals are released to each producing work center for each standard pack of component parts required. When a POLCA signal appears at the producing work center it is available to authorize replenishment production of component items produced at that work center. In the present invention the MTag signal acts just like the POLCA signal. When MTags are used in conjunction with kanban, replenishment begins when sufficient empty kanban, MTags, and any other required production control signals (such as DTags and/or CMTags) are also present at the producing work center and work center capacity permits. This production control policy results in more empty kanban (less inventory) for the component part on average in the production control system. The MTag, as in POLCA, thus provides for limiting excess inventory in front of, for example, a bottleneck work center.

As discussed above, the other production control policy enabled by the present invention is CONWIP, which is enabled by a special form of the MTag, the CMTag. The CONWIP production control policy is similar to POLCA in that it provides a constraint that is not part-specific. The CONWIP authorization signal, the CMTag in the present invention, is neither part-specific nor work center-specific; it is instead site specific. The purpose of the CMTag is to limit the total amount of WIP throughout the production control system (hence the name CONstant WIP). The CMTag provides an additional constraint on production at one or more stage 1 work centers, which work centers generally consume only raw or procured materials. The stage 1 work centers are generally the most upstream work centers in the value stream (supply chain network), and which produce components required in most or all finished good items produced at the site. At such a stage 1 work center, a CMTag is needed for every part produced at that work center, so production may only begin when the number of CMTags available at the work center is the standard pack quantity times the trigger quantity. Once a standard pack is completed, a CMTag is assigned to each unit of material in the standard pack. Each CMTag travels with its assigned component throughout the value stream and is only released back to stage 1 work centers to authorize further production when the finished good comprising the unit of material to which the CMTag is assigned is shipped to one or more customers 130a-130n. At that time the CMTag is released and made available to another initial production work center as appropriate.

In one embodiment, if the number of units of stage 1 parts per intermediate or finished good item is large, the number of CMTags in the system may become quite large, and may be bulky or awkward when, for example, physical cards are used to implement CONWIP controls. To mitigate this problem, embodiments provide for selecting a subset of the parts produced at stage 1 work centers for CMTag authorization, rather than all stage 1 produced parts, may be sufficient. If there is a single stage 1 produced part that appears in all finished good items in a relatively constant proportion per finished good item, then enabling CMTag authorization for that one part has much the same effect on the system as enabling CMTag authorization for all stage 1 parts. However, if the distribution of this part is such that there are more units of the part in some finished good items than others, then enabling CMTag authorization for only this part will allow more finished goods inventory of items that consume less of the part, and less finished goods inventory of those items that consume more of the part. If this is inappropriate, than a subset of parts can be identified that behave in the desired manner, that is, when considered as a group the proportion consumed by each finished good item is approximately the same. When this is the case, CMTag authorization is enabled for that subset of parts, rather than for all stage 1 parts, to achieve the desired CONWIP result. In any case, selecting a subset of parts rather than all stage 1 produced parts implies that production at other stage 1 work centers, not controlled by CONWIP, will not be constrained and therefore excessive inventories may result.

In one embodiment, the behavior of CONWIP is such that it only constrains the initial operations of a value stream. That is, since a CMTag is assigned to every single unit of material for key produced parts, there will always be CMTags available for every task at downstream operations, so these operations will not be constrained by CMTags. In addition, the CMTag loop size limits the total amount of inventory possible in the production control system at any particular time, and when enabled in conjunction with kanban, CMTags result in fewer full kanban on average. This is particularly useful in high mix environments where the demand pattern may shift so frequently that keeping the kanban loop sizes fully aligned with the demand mix is impractical. If, for example, the total volume of demand is relatively stable then a constant CMTag loop size can be used in addition to kanban to allow the mix to change with demand and utilize larger kanban loop sizes without incurring the additional inventory expense necessary to maintain responsiveness. Otherwise, when the total volume of demand is relatively unstable, the CMTag loop size must be constantly realigned with the demand signal in order to maintain customer service and optimal inventory levels. In addition, setting the CMTag loop size to the sum of all of the kanban loop sizes in the system disables the CMTag constraint by making it non-constraining.

In another embodiment, the kanban production control signal supports pull-based production control on the "production floor" of one or more entities 120a-120n. A kanban is a part-specific signal required to authorize production of a standard pack of that part. The number of kanban signals present in the production control system represents the total amount of inventory of the part possible in the system at any one time.

FIG. 4 illustrates an operator dashboard interface 400 provided at each work center 310a-310n of FIG. 3. In one embodiment, operator dashboard interface 400 comprises one or more graphical elements including job queue 410, production history 412, and buttons 430. Although, operator dashboard interface 400 is shown and described as having one or more graphical elements including a visual representation of job queue 410, a plurality of tasks 411, production history 412, production control signal types 420a-d, and buttons 430, embodiments contemplate any suitable number of graphical elements, according to particular needs. As will be explained below in greater detail, operator dashboard interface 400 provides a visual representation of a production control framework to, for example, determine which tasks 411 to produce, the order in which to produce tasks 411 and a record of when each task 411 is started and completed for each work center 310a-310n.

As discussed above, production control system 110 of FIG. 2 utilizes three types of production control authorizations, the DTag production control signal, the MTag production control signal and the kanban production control signal, in order to authorize production of one or more tasks 411. In one embodiment, the DTag production control signal is a part-demand-specific signal, which is derived from level plans published on all pacemakers, including any additional finished good demand that is not supplied at some point by a pacemaker. The consolidated demand production control signal (of pacemaker and extra finished good demand) is propagated to an upstream work center by one or more engines 212. In addition, or as an alternative, one or more engines 212 explodes a BOM of each demanded part to determine component requirements at each level of the BOM. The requirement being, for example, the component part ID, quantity needed, and a start date which is offset from the pacemaker start time or demand due date by a conservative estimate of the time needed to produce the component part and transport it to the demand source (pacemaker group or finished goods inventory) by the start time/due date. In addition, one or more engines 212 calculates the component requirements and consolidates the unfulfilled requirements into component part standard pack, assigns a due date from the earliest start/due date of any demand represented in each standard pack, and allocates all started and/or full kanban of demanded components to the above demanded standard pack based on, for example, highest priority, while accounting for phase-in/phase-out requirements, other engineering changes, and the like.

In one embodiment, the DTag capability is turned on and off at the part level, along with other part-specific data, for example, via a Boolean flag indicating whether a part utilizes the DTag functionality. In one embodiment, the default setting is N. In addition, when the DTag setting is at the part level, once the netted standard pack requirements are determined by one or more engines 212, a DTag comprising the component part ID and due date is generated for each standard pack requirement for that part. In one embodiment, the DTags are visually represented in the operator dashboard interface 400 for the producing work center. When, for example, more than one work center produces a part, allocation of demand to the relevant work center is defined in a part-work center data table in a demand_proportion field, which must, for example, sum to 1 across all part-work center combinations of each part.

In another embodiment, production control system 110 provides a site-wide Boolean flag, print_dtags, to allow DTag signals to be printed into physical cards. If the setting is N, then the DTag printing capability is disabled. However, if the setting is Y than the DTag printing capability is enabled and a DTag printing button is visually displayed in a production control system Master DB (a separate interactive user interface in production control system 110 which provides an overview of the status of the entire production system) wherein the DTag printing button is visually grayed out if all DTags have been printed, otherwise it is visually highlighted to indicate that a DTag printing workflow needs to be completed. In one embodiment, the DTag printing workflow is invoked when a new demand signal is received from one or more customers 130a-130n, for one or more parts requiring DTags. In addition, the dates for the DTags signals are maintained in a current and accurate state by production control system 110 and displayed in the operator dashboard interface 400.

In an embodiment, when the DTag setting is set to N for a part, at the instant a standard pack is consumed and an empty kanban is released (to be returned to the producing work center), production control system 110 provides an empty kanban signal to authorize replenishment production of the part at the producing work center. In addition, if a DTag is not required for that part type then production control system 110 displays a task in operator dashboard interface 400 of the part's producing work center corresponding to the empty kanban irrespective of any demand in the system for that part.

In another embodiment, when the DTag setting is set to Y for a part, new tasks 411 for the part appear in operator dashboard interface 400 based on standard pack requirements for the part from one or more engines 212 rather than, for example, downstream consumption of the part generating empty kanban. When, for example, the DTag setting is set to Y for a part, a separate column in job queue 410 indicates the number of DTags needed for its tasks since tasks will not show up in job queue 410 without a DTag to generate them. In addition, if an unsatisfied DTag exists for a part, a new task 411 is created in operator dashboard interface 400 for that part irrespective of the presence or absence of an empty kanban for that part, and the task 411 is associated with the DTag until the task 411 is started, at which time the DTag is dropped from the production control system 110.

As an example only and not by way of limitation, production control system 110 creates a DTag signal for each standard pack demanded. The DTag is assigned to that standard pack, wherein the DTag is not defined at the work center trigger quantity for the part but at the standard pack level. That is, each task 411 on a work center 310a-310n is available to satisfy the number of DTags in the trigger (TRG) field 415, which is the number of standard packs in the trigger quantity. A new task 411 for the trigger quantity of the part on the work center 310a-310n is created in the operator dashboard interface 400 whenever there are unsatisfied DTags for the part, when other tasks 411 are fully allocated to other DTags.

In addition, or as an alternative, when a task 411 is generated to accommodate an unsatisfied DTag, the DTag is assigned to this task 411 and the quantity required by the DTag is assigned to the DTag from the task 411. In addition, production control system 110 assigns the balance on hand (BOH) field 414 and assigns the days of cover (DOC) field 419 to each task 411 of job queue 410. The part type and due date from the DTag help define the priority of the task 411. Any remaining quantity from the task 411 after satisfying current DTags is available to satisfy new DTags for the part, that is, as new DTags are created by one or more engines 212. In addition, downstream consumption of the part provides empty kanban necessary to authorize tasks 411, but tasks 411 will always be present in the operator dashboard interface 400 sufficient to satisfy all demand for the part generated by the one or more engines 212 that cannot be satisfied from full kanban (compete standard packs in inventory), wherein an empty kanban signal is not required for the appearance of such tasks in operator dashboard interface 400.

In one embodiment, the kanban (KB) field 420b in operator dashboard interface 400 indicates whether the required kanban are also present to complete the authorization. Production control system 110 does not allow the initiation of production of tasks 411 that require more kanban than there are empty kanban for that part in the empty kanban queue at the work center 310a-310n. For example, in order to start production of such tasks 411 the trigger quantity of the task 411 must be decreased to reduce required authorizations until available kanban are sufficient. The task 411 start date calculated by one or more engines 212 is used in the prioritization of the tasks, along with demand type (build-to-order (BTO) or make-to-stock (MTS)) and setup requirements, so that, for example, more urgent tasks are noted and completed first. In addition, once a standard pack requiring a DTag is partly consumed by a downstream process, at the point where its kanban is considered "empty" and released to the upstream producing work center 310a-310n to authorize further production, the DTag for this standard pack is also removed or deleted from production control system 110. This embodiment tends on average to slightly overestimate the demand for DTags by the quantity of parts in partial kanban and in started but incomplete standard packs of parent parts consuming the component part.

In one embodiment, when one or more engines 212 runs, it first deletes all DTags in the system, generates new DTags based on current demand, assigns DTags to any started and/or full kanban and unstarted tasks 411, creates new tasks 411 for remaining DTags, and then recalculates the priorities of the unstarted tasks 411 in operator dashboard interface 400 of the producing work center 310a-310n and sorts these unstarted tasks 411 in each work center 310a-310n accordingly. When, for example, there are not enough DTags to assign to unstarted tasks 411, for example, when there has been a decrease in demand, one or more engines 212 deletes remaining tasks 411 without any DTags from operator dashboard interface 400.

In one embodiment, the MTag production control signal represents a material authorization. That is, the MTag grants permission to have material (inventory) in the system based on available capacity (i.e., it is not part-specific). Production control system 110 stores two tables, which define the MTag static data separately from the MTag dynamic data, associated with one or more entities 120a-120n and/or one or more customers 130a-130n, in database 220. In addition, production control system 110 utilizes these two tables in the production environment to populate MTags in operator dashboard interface 400. In one embodiment, the first MTag Type table comprises static data including the following fields, as shown below in Table 1.

TABLE 1

| Field Name | Type | Default | Description |
| --- | --- | --- | --- |
| card_name | ID | required | Unique name for the MTag, indicating the relevant work center combination |
| description | String | null | Description of MTag, detailing the relevant work center combination |
| consuming_wc | List | required | downstream work center in MTag work center pair |
| producing_wc | List | required | upstream work center in MTag work center pair |
| start_date | List | Today | First date card is active. List of dates includes today from production control system Site Parameter table and any week_start_day (Generally Sunday or Monday, populated in the production control system Site Parameter table). |
| end_date | List | INF | First date card is inactive. List of dates includes INF and any week_start_day (Generally Sunday or Monday, populated in the production control system Site Parameter table). |

As shown above, table 1 requires one or more entries (rows) for each MTag. Each entry defines the consuming work center in consuming_wc and the producing work center in producing_wc, wherein each is populated from a list of work centers. The description field may be optionally populated and has "producing_wc to consuming_wc" as its default. The start_date and end_date fields may be populated with defaults that enable the MTag definition indefinitely, but may also be populated with any date defining a weekly boundary (the day of the week, for example Sunday, defined by the parameter week_start_day in production control system Site Parameter table), if desired to enable the MTag only for a particular period.

In another embodiment, the second MTag table (Table 2) is the MTag Size table, defining the loop size for each MTag specified in the MTag table, as well as the loop size of the CMTag, (the site-wide CONWIP MTag). CMTag is a special MTag with neither a consuming nor a producing work center defined, and which may always be defined in production control system 110. The MTag Size table (Table 2) comprises dynamic loop size data including the following fields for each MTag in the MTag table, as well as for the site-wide CMTag, as shown below in Table 2.

TABLE 2

| Field Name | Type | Default | Description |
| --- | --- | --- | --- |
| card_name | List | N/A | Provided from MTag data (or "CONWIP" for the CMTag entry) |
| description | FString | N/A | Provided from Description in MTag data (or "CONWIP authorization" for the CMTag entry) |
| max | FInt | N/A | Maximum MTag value, calculated by production control system 110 |
| use_max | Y/N | Y | Should production control system 110 use the max value for the quantity? Y effectively turns off MTag capability by making it non-constraining |
| quantity | Int > 0 | Max | Loop size: the number of cards deployed in system. Max is unconstraining, indicating that the MTag is ineffective, or turned off. |
| start_date | Date | Today | First date quantity of card active. List of dates includes start_date from the corresponding MTag definition in the MTag table and any following week_start_day (Generally Sunday or Monday, populated in production control system Site Parameter table) before the end_date. |
| end_date | Date | INF | Last date quantity of card active. Cannot be on or before the start_date above or after the end_date of the corresponding MTag definition in the MTag table. |

In the above Table 2, use_max, quantity, and the start_date and end_date fields may be populated by the user of production control system 110. The use_max field indicates whether production control system 110 should use the value in the max field in the quantity field. In one embodiment, the default for use_max is Y, which disables the MTag feature by making it non-constraining. In this case, any value in the quantity field is ignored. When MTags are enabled in production control system 110 then the use_max field is set to N and a value less than max is entered in the quantity field, which may be a custom value. In addition, the max field may be populated with a very large value, or with a symbol for infinity, for example, "INF."

In addition, or as an alternative, production control system 110 automatically calculates and displays a meaningful value for max. For example, for MTags (those with a producing_wc and consuming_wc populated) this max value may be the sum of the loop sizes of all of the components supplied from producing_wc to consuming_wc and all of the loop sizes of all of the components produced at consuming_wc. That is, when production control system 110 automatically calculates the max default setting, a reasonable constraining boundary is identified and a comparison as to how constraining to the production control system a custom entry for quantity will be. For example, any quantity less than max may potentially constrain production flow, and the smaller the custom quantity value is in relation to the max value the more likely material flow will be constrained. In one embodiment, if this feature is enabled, an additional enhancement may be provided to support calculating the quantity of MTags in the system as a proportion of the max value by allowing quantity entries >0 and <1, which yield the quantity of MTags in the production control system when multiplied by max.

As discussed above, with respect to Tables 1 and 2, there may be multiple entries for each MTag definition in order to allow for a time-phased control of the MTag behavior. However, there must at all times be exactly one MTag entry in each of Tables 1 and 2 that has a start_date of Today (the production control system 110 start date) and one MTag entry having an end_date of INF (for example, corresponding to eternity or to some date beyond the planning horizon). In one embodiment, the MTag Size table (Table 2) is automatically populated with one row for each MTag defined in the MTag Type table, and one additional row to define the CMTag.

If, for example, a planner associated with one or more entities 120a-120n wishes to enter multiple instances of a particular MTag (CMTag) configuration, the planner may change the start_date or end_date of an existing entry to another weekly boundary (that being a date in the planning calendar corresponding to the day of the week stored in week_start_day). In this case, production control system 110 automatically generates a new MTag (CMTag) entry for the remaining period for which there is no definition, populates the start_date and end_date appropriately, populates the use_max value with "N," and leaves the cursor in the quantity field for the next planner entry.

The interactive MTag tables may also allow a planner to modify entries by adjusting the start_date or end_date to another weekly boundary such that the span between these dates is at least one week, in which case production control system 110 may accordingly adjust the start_date or end_date of the period which is overlapped by the change. In addition, the planner may change the start_date of one entry to be the same as the start_date of some earlier period, or may change the end_date of one entry to be the same as the end_date of some later period. In either case, production control system 110 may automatically remove the overlapped entries, and may also advise the user of the pending event prior to executing it and request the approval of the planner to do so, only executing the event if the planner approves the action. The planner may then generate any desired pattern, and any pattern generated by the planner will exactly partition the planning horizon, such that MTag definitions do not overlap or contain gaps.

As an example only and not by way of limitation, production control system 110 deploys the MTags via operator dashboard interface 400. The number and types of MTags assigned to a produced part at a work center 310a-310n is derived from the MTag definitions in MTag Tables 1 and 2, and from the relevant BOMs. In one embodiment, each MTag represents a standard pack of input parts consumed at consuming_wc. The number of MTags given in the MTag quantity field in the MTag table for each type of MTag may be distributed among numerous states (states 1-5) for that MTag depending on the status of, for example, a production floor of one or more entities 120a-120n, in the following order:

1. All tasks 411 that are currently started at consuming_wc but are not yet released to the downstream work center or inventory buffer, where each physical MTag is attached to a standard pack of parts produced at consuming_wc.
2. In the input queue of consuming_wc, where any physical MTags are attached to full or partial standard pack of consumed parts.
3. Finished standard packs at producing_wc, where MTags are attached to standard packs of parts produced at producing_wc and consumed at consumed_wc.
4. Started (and unfinished) tasks 411 at producing_wc, where MTags are attached to standard packs of parts produced at producing_wc and consumed at consumed_wc.
5. MTag queues at producing_wc, where MTags wait to be attached to tasks as tasks are started.

In one embodiment, production control system 110 assigns MTags to each produced standard pack at a work center that is listed in the consuming_wc field in the MTag table. When a new standard pack is started at consuming_wc, for each producing_wc/consuming_wc combination, the new standard pack produced at consuming_wc is assigned the MTags that were assigned to the component part standard packs supplied by producing_wc that are consumed by the new standard pack. In one embodiment, these MTag quantities may be fractional, within production control system 110, depending on the quantity of items in a standard pack of the produced part, the quantity of items in a standard pack of the consumed part, and the quantity of consumed item consumed per unit of produced item in the BOM.

In another embodiment, in a physical deployment of the MTags, the physical MTag may be attached to a standard pack of parts produced at consuming_wc that consumes the last component of the consumed part standard pack to which the MTag was previously attached. In such cases when the standard packs are completed at consuming_wc they are released to the downstream work center or inventory buffer in the order in which they were started. Otherwise, the number of MTags present at the consuming_wc may not properly reflect the total quantities of the consumed parts which are present at the consuming_wc. In such cases, a larger number of MTags may be required for adequate production flow at consuming_wc, and the control over the component inventories at consuming_wc may not be as precise.

In one embodiment, when production control system 110 identifies that a completed standard pack leaves an MTag consuming_wc, production control system 110 releases the MTags assigned to that standard pack back to, for example, states 2 through 5 above, first to state 2, then to state 3, then to state 4, then to state 5. If, for example, the production floor of one or more entities 120a-120n is executing and reporting production and inventory movements correctly, released MTags may only be moved from 1 to 5, since 2 and 3 may already be saturated with MTags.

In one embodiment, an MTag filter 418 is visually illustrated as an option in operator dashboard interface 400 and filters out tasks 411 requiring MTags when, for example, there are no MTags available in the MTag Queue. If MTag filter 418 is turned on (visually checked), tasks 411 may only appear in operator dashboard interface 400 if there are, for example, both sufficient kanban and MTags present in the respective queues. In such a state, all tasks 411 appearing in operator dashboard interface 400 are fully authorized by MTag and kanban availability. In such an embodiment, the MTag (MT) field 420c and kanban (KB) field 420b provide no additional information and therefore need not be visually represented. MTag filter 418 eliminates visual clutter from operator dashboard interface 400 when kanban loop sizes are significantly higher than MTag availability.

In addition, once MTags are released at consuming_wc, normally to, for example, state 5 above, which is the MTag Queue of producing_wc, if additional tasks are available in the producing_wc but are not visually displayed since MTag filter 418 is turned on, implying there are empty kanban in the Kanban Queue that have generated such tasks, then production control system 110 visually displays all tasks that are now fully authorizable in their MTag and kanban requirements. MTags by themselves, without corresponding empty kanban, may not generate new tasks 411 since the MTags are not part-specific.

In one embodiment, the kanban and MTag signals are not actually assigned to task 411 when the task is created, but the signals remain in their respective queues until production of task 411 is initiated. A task may not be initiated until it is authorized, and a task may not be authorized until there are at least as many kanban for that part in the kanban queue as the trigger quantity, and at least as many MTags in the MTag Queue, having their consuming work centers defined as the consuming_wc in the MTag, as the trigger quantity. Once an authorized task is initiated, the number of empty kanban for the produced part of the task in the kanban queue, and MTags in the MTag Queue having a consuming_wc that consumes the part, are both reduced by the trigger quantity of the started task. If, for example, there are multiple types of MTags in the MTag Queue with different consuming_wc entries that both consume the same item, indicating there are multiple MTag destinations requesting the item from the work center, production control system 110 assigns the MTag type with the largest percentage of its MTags in MTag Queue, presuming that this measure indicates which producing work center supplying MTags is most in need of component parts.

In one embodiment, with respect to the CMTag, at least one CONWIP entry must always be present in the MTag Size table (Table 2) with a generic CMTag card_name of, for example, "CONWIP." The default value for the max field of this CMTag entry may be infinity, or some extremely large number, for example, one trillion. However, production control system 110 may populate this default value with a more meaningful value, which is a more reasonable boundary condition defining when the CONWIP constraint may become effective.

In another embodiment, production control system 110 provides an additional CMTag field in a production control system part data, with default=Y. Production control system 110 stores and accesses production control system part data in database 220, in, for example, a table. By default, production control system 110 turns on CMTags for all stage 1 parts when CMTags become constraining, and thereby may begin to constrain production of all stage 1 parts. If, for example, production control system 110 implements CONWIP on a subset of the stage 1 parts, the CMTag field is set to N in the production control system part data for those stage 1 parts that are not to be constrained by CONWIP. In addition, or as an alternative, the CMTag field may be ignored for all parts that are not produced at stage 1 work center 310a, as determined by the BOM and Part-work center data.

In one embodiment, a reasonable boundary condition for the CMTag max field is the total quantity of all stage 1 produced parts having CMTag=Y in the production control system part data present in the production control system if all of the kanban in the production control system were full. This quantity is the sum of the products of the loop sizes all of the kanban in the system with their respective consumed quantities of the CMTag components anywhere in their BOM structure, determined via an explosion of the relevant BOM structures in the production control system BOM table. If, for example, the CMTag quantity field is set below this max value and use_max=N, then CMTags begin to constrain production. Any quantity values higher than max may effectively disable CMTag behavior when use_max=N, such that production is never constrained by CMTags. When calculated by production control system 110, this max value is automatically updated by production control system 110 whenever kanban loop sizes or finished good inventory targets are updated, and is, for example, the largest such value at any point between the start_date and end_date for that entry in the MTag Size table (Table 2).

In another embodiment, the site-wide CMTag operates differently and is configured differently than the work center-specific MTags. For example, when production control system 110 enables CONWIP (CMTag quantity setting lower than max in current time period and use_max=N), a CMTag is required by production control system 110 to authorize production of a CMTag part (any part having CMTag=Y in part data) at stage 1 work center 310a (e.g., a work center consuming only raw or procured materials). In addition, a CMTag is never required by any other type of task (since any other task in production control system 110 will be consuming a component that has at least 1 CMTag assigned to it). When use_max=N during the current time period, any CMTag quantity setting lower than the max value during the current time period causes the operator dashboard interface 400 of every stage 1 work center 310a which may produce a stage 1 CMTag part to visually display a CONWIP (CW) field 420d and a CONWIP button 434.

In one embodiment, CMTags are deployed at stage 1 work center 310a via a CMTag Queue. For each task 411 requiring CMTags in job queue 410 of stage 1 work center 310a, the CONWIP (CW) field 420d displays the number of CMTags needed for authorization of the task in addition to the number of CMTags already present in the CMTag Queue at work center 310a.

In an embodiment, when CMTags are constraining material flow, stage 1 work center 310a is often starved of empty CMTags and places a CMTag request to one or more engines 212 that manage the distribution of empty CMTags among the stage 1 work center 310a when CMTags are released from finished good inventory (which is when a finished goods standard pack is shipped from the finished goods inventory system). To enable this CONWIP request and acquisition workflow when CMTags are in effect at a stage 1 work center 310a, an additional field 435 is visually displayed in the operator dashboard interface 400 that indicates the number of CMTags represented in unfulfilled CONWIP requests already made by other Work Centers The value in field 435 provides a visual indication of how long a wait may be until a new CONWIP request is fulfilled. For example, a value of 0 in the CONWIP (CW) field 420b means that there are no unfulfilled CONWIP requests in the system, and that selecting the CONWIP button generates a new CONWIP request that would be satisfied by before any other work center's CONWIP request, such that the work center will receive all CMTags that become available until the new CONWIP request is fulfilled. If, for example, field 435 is highlighted, the value indicates that an open CONWIP request has been made and the visually displayed value is the number of CMTags required to fulfill earlier CONWIP requests made by other work centers, which were made before the current CONWIP request by the current work center.

In one embodiment, a check mark in CONWIP (CW) field 420b visually indicates that there are sufficient CMTags available in the CMTag Queue of the work center to authorize production of the task. The CMTags in the CMTag Queue are available to authorize any task 411 requiring CMTags for authorization; the CMTags are not assigned to tasks 411 requiring them until tasks 411 are started, and so all CMTags at the work center are available to all unstarted tasks at the work center to authorize whichever task 411 is started. If, for example, the number of CMTags available in the CMTag queue at stage 1 work center 310a is insufficient for a particular task 411, the remaining required quantity of additional CMTags needed to authorize task 411 may be displayed in CONWIP (CW) field 420b for that task, and may also be requested by one or more engines 212.

As an example only and not by way of limitation, one or more engines 212 enables automatic distribution of CMTags across stage 1 work center 310a based on CMTag requests and task priorities. In doing so, production control system 110 defines a free CMTag as a CMTag that is not assigned to a started (or finished) task or to a work center to satisfy a CONWIP request. Remaining CMTags are assigned, either to stage 1 work center 310a or to parts produced at stage 1 work center 310a. Assigned CMTags become free when finished goods containing the relevant stage 1 produced parts are shipped from one or more entities 120a-120n, in which case the number of CMTags consumed by the finished good item in its order tree are released to the one or more engines 212. CMTags are also released to one or more engines 212 when the respective work center starts a task that requires fewer CMTags than the quantity assigned to the work center, in which case the remaining CMTags assigned to the work center are released to one or more engines 212. Each shipped finished good component releases one CMTag for each unit of a CMTag part it comprises.

In addition, when the CMTags are activated (CONWIP entry quantity<max and use_max=N in MTag Size table (Table 2) in MTag definition effective in current period). One or more engines 212 perform the CONWIP assignment workflow (discussed in more detail below) on a predetermined time basis, such as, for example, every 30 seconds, 1 minute, or any other predetermined basis.

In order to further explain the operation of the CONWIP assignment workflow, an example is now given. In the following example, each work center 310a-310n producing a CMTag part (even theoretically, based on the BOMs of the parts assigned to the work center for production, even if there is currently no demand for the part) CONWIP button 434 may be present in the particular work center's operator dashboard interface 400. CONWIP button 434 may be grayed out unless the selected task in job queue 410 is CMTag infeasible due to lack of CMTag availability at the work center, in which case there are insufficient CMTags available in the CMTag Queue at the work center to authorize the selected task due to insufficient free CMTags in the system. In this case, when the selected task is CMTag-infeasible, the CONWIP button 434 is visually highlighted in the operator dashboard interface 400.

A different task 411 may be selected, such as a task that is CMTag feasible or one that does not require CMTags. In addition, a CONWIP request may be requested which opens a request to one or more engines 212 for the standard pack quantity times the trigger quantity of the selected task. Any other task with sufficient CMTags available or a task that does not need CMTags may then be started, wherein the START button 431 is visually highlighted in order to initiate production. If, however, another task 411 is selected that has insufficient CMTags during an open CONWIP request then CONWIP button 434 is visually highlighted, only if the selected task needs more CMTags than what has already been requested from one or more engines 212. If CONWIP button 434 is then selected, the earlier unsatisfied CONWIP request is cancelled and a new CONWIP request is submitted to one or more engines 212 for the total quantity needed for the selected task and placed last in the queue of open CONWIP requests in one or more engines 212. In this manner, the CONWIP assignment workflow only permits one open CONWIP request in one or more engines 212 from any one work center at any one time.

In addition, or as an alternative, in fulfilling CONWIP requests, one or more engines 212 assign the requested quantity of CMTags to the work center of the CONWIP request that has been open the longest (a FIFO assignment), or if there isn't enough to satisfy the request, all remaining CMTags, in which case one or more engines 212 tries to complete this last unfulfilled request first in the subsequent CONWIP assignment workflow. The CONWIP button is grayed out in the operator dashboard interface 400 when one or more engines 212 satisfy the CONWIP request. All CMTags assigned to the work center in fulfillment of a CONWIP request remain assigned to the work center until the next task 411 is started on that work center. A task 411 that is authorizable may be started whenever no task is currently running on the work center. If a task 411 is started requiring CMTags then the CMTags required by that task are assigned to the task from the CMTags available at the work center, and these CMTags remain assigned to the units of material in the standard pack until finished good items fed by the task 411 are shipped from one or more entities 120a-120n. Any remaining CMTags assigned to the work center are then released to one or more engines 212 as free CMTags and are available for redistribution by one or more engines 212 in the next CONWIP assignment workflow. These released CMTags remain in the CMTag Queue of the work center until they are recalled by one or more engines 212, and while in the CMTag Queue are available to authorize further production at the work center.

In another embodiment and to further explain the operation of operator dashboard interface 400, an example is now given. In the following example, job queue 410 displays a list of all tasks currently planned at each work center 310a-310n and provides visibility concerning the status of each task 411. As an example only and not by way of limitation, operator dashboard interface 400 visually displays seven tasks 411 in job queue 410 (although scroll bar 421 indicates the presence of many other lower-priority tasks 411 in the queue, not shown). Although only seven tasks 411 are visually shown in FIG. 4, embodiments contemplate (as indicated by the scroll bar 421) any number of tasks 411, according to particular needs.

In one embodiment, tasks 411 are sorted by the priority (P) fields 413 such that, for example, the highest priority tasks (i.e., with smaller priority values) appear at the bottom of job queue 410, near production history 412 (tasks in the bottom portion of operator dashboard interface 400). Although a particular priority is shown and described, any suitable sorting or prioritization may be applied to tasks 411, according to particular needs.

In another embodiment, production control signal types 420a-d of job queue 410 indicate whether or not each task 411 comprises the appropriate authorizations in order to authorize production. If not, production control signal types 420a-d indicate how many additional signals of each relevant production control signal types 420a-d are required to authorize the task. For example, tasks 411 having the required authorization production control signals available to authorize production provide a visual indication of a check mark in the respective fields of the particular production control signal types 420a-d. In addition, tasks 411 that do not have the required authorizations of a particular production control signal type 420a-d visually indicate in the respective fields how many additional authorization production control signals of that type each task 411 requires in order to authorize production (i.e., 2, 3, 4, etc.).

In an embodiment, trigger (TRG) field 415 displays a trigger value when the required number of kanban for each task 411 in job queue 410 exceeds a predetermined value, such as for example, one. The trigger value is the number of kanban required for each part associated with each task 411 to authorize production.

In another embodiment, production control system 110 displays the MTag (MT) field 423 when any MTags exist which have the particular work center 310a-310n as the producing work center 310a-310n. Any parts produced on the producing work center 310a-310n and consumed on the consumed work center 310a-310n of such an MTag will populate the MTag (MT) field 423 on the producing work center 310a-310n. However, if a task 411 does not require a production control signal type 420a-d then the MTag (MT) field 423 remains blank for the respective field. In addition, unselected tasks 411 that are ready (i.e., fully authorized for all required production control signal types 420a-d other than CONWIP), are visually represented by highlighting in, for example, a different color and/or font type. In addition, the selected task 411 is visually highlighted, in for example, a different color and/or font type, whether it is fully authorized for production or not. Although a particular visual representation of highlighting is described, embodiments contemplate any suitable highlighting in color, text color or style of font of the text, such that the visual representation of the data may be visually highlighted, according to particular needs.

In an embodiment, production of a ready task 411 in job queue 410 is initiated with sufficient CMTags, one of the highlighted tasks is selected (if the desired task is not already visually highlighted in a different manner, which is by default the bottom task in the sorted list when no tasks are currently running on the work center 310a-310n). This action visually grays out START button 431, moves the selected task 411 into the production history 412 of operator dashboard interface 400 and visually highlights PAUSE button 432 and DONE button 433. When task 411 is finished, the operator may select the DONE button 433, or the production control system may automatically select DONE button 433 upon completion of the task, at which time the DONE button 433 may be visually grayed out, which completes the task's production history 412 information, and the last unstarted task in job queue 410 and START button 431 may then be visually highlighted. As discussed above, although a particular visual highlighting is shown and described, data may be highlighted according to any suitable needs.

Modifications, additions or omissions may be made to operator dashboard interface 400 without departing from the scope of the invention. As an example and not by way of limitation, operator dashboard interface 400 may have more, fewer, or other graphical elements. Moreover, the operation of operator dashboard interface 400 may be performed by more, fewer, or other graphical elements, arranged in any suitable manner, according to particular needs.

Figure 5:
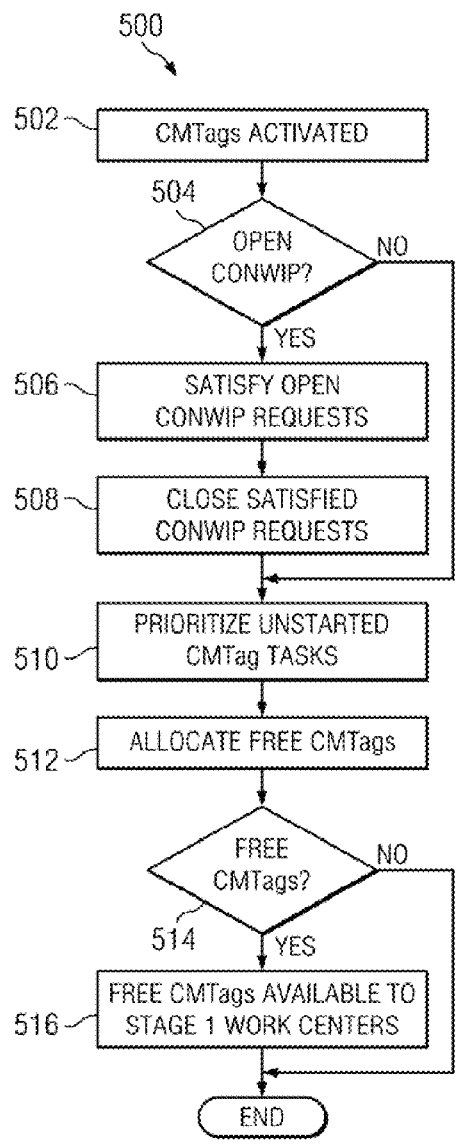
FIG. 5 illustrates an exemplary method for performing a CONWIP assignment workflow.

FIG. 5 illustrates an exemplary method 500 for performing a CONWIP assignment workflow. The method begins at step 502, when the CMTags are activated (CONWIP entry quantity<max and use_max=N in MTag Size table (Table 2) for an MTag definition effective in current period). As discussed above, one or more engines 212 perform the CONWIP assignment workflow on a predetermined time basis.

At step 504, one or more engines 212 determines if there is an open (unsatisfied) CONWIP request from a stage 1 work center 310a. If there are open (unsatisfied) CONWIP requests, the method proceeds to step 506, otherwise, the method proceeds to step 510.

At step 506, one or more engines 212 recalls any free CMTags, in quantities sufficient to satisfy open CONWIP requests, and assigns sufficient free CMTags to each stage 1 work center 310a generating a CONWIP request, in, for example, a First-in First-out (FIFO) manner, satisfying older CONWIP requests first. Next at step 508, one or more engines 212 close satisfied CONWIP requests, that is, close requests where one or more engines 212 has assigned to the requesting work center the requested quantity of CMTags in that work center's open CONWIP request.

At step 510, one or more engines 212 prioritize all unstarted CMTag tasks 411 planned on any stage 1 work center 310a which are authorizable apart from the CMTag (those tasks which have sufficient authorization and inventory otherwise) on a common priority scheme comparable to that used in operator dashboard interface 400 at each stage 1 work center 310a. Next, at step 512, one or more engines 212 allocate remaining free CMTags to work centers to satisfy tasks 411 by highest priority, update the relevant values in the CONWIP (CW) field 420d of job queue 410, but do not assign these free CMTags to the work center. (The CMTags are still considered free, and will be recalled from the work center to fulfill open CONWIP requests as needed, first from work centers with the lowest priority tasks. Until such time as free CMTags are recalled by one or more engines 212, they remain available to authorize any task at that work center.)

Next at step 514, one or more engines 212 determine if any free CMTags remain. If there are any free CMTags, the method proceeds to step 516, otherwise, the method ends. At step 516, one or more engines 212 makes the remaining free CMTags available to stage 1 work center 310a with the largest sum of the values in the CONWIP (CW) field 420d and updates the CONWIP (CW) fields 520d values accordingly. Once the CONWIP (CW) fields 520d are updated, the method ends. In addition, although, FIG. 5 illustrates one embodiment of a method for performing a CONWIP assignment workflow, various changes may be made to method 500 without departing from the scope of embodiments of the present invention.

Figure 6:
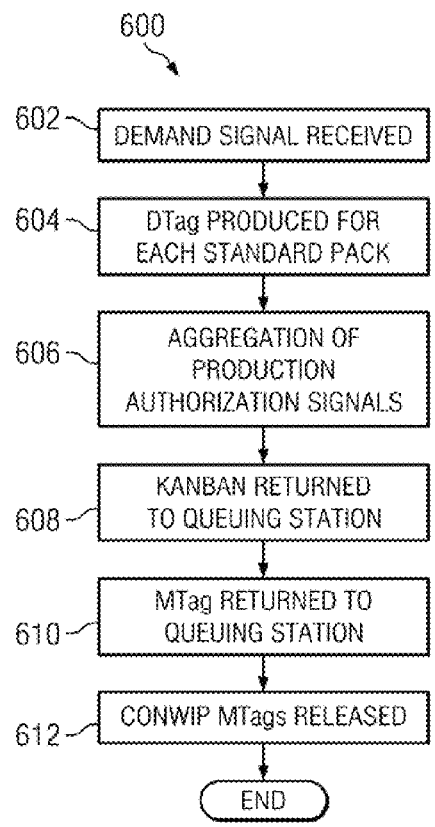
FIG. 6 illustrates an exemplary method for providing production control authorization signals in the production environment of the entity of FIG. 1.

FIG. 6 illustrates an exemplary method 600 for providing production control authorization signals in the production environment of entity 120a. The method begins at step 602, where a demand signal is received from one or more customers 130a-130n at production control system 110. The demand signal is propagated into N+1 DTag signals, 1 for each of N work centers 310a-310n and 1 for the final finished goods buffer. At step 604, a distinct DTag is produced for each standard pack of each part ID required at every work center, after rounding up the gross requirement of each part to the nearest standard pack. In addition, dependent component material requirements are propagated to upstream work centers based on, for example, lead times, BOMs, yield and engineering change notice (ECN).

In one embodiment, production control system 110 replaces all existing DTags and re-propagates the entire DTag signal each time the demand signal is updated. In another embodiment, production control system 110 provides a net change type of workflow wherein only the new demand signals are propagated. In either embodiment, the DTag is deleted or destroyed once it has succeeded in authorizing production of a standard pack and production has been initiated. In addition or as an alternative, if that standard pack is not completed or is scrapped, other means in the production control system may be initiated to make up the production, as in the use of safety stock, etc, such that the DTag need not be recreated.

At step 606, Synchronization Station U, shown in FIG. 3 coordinates the timely aggregation of multiple production authorization signals to ensure that all authorizations required by task 411 are present before production is initiated. Each $U_i$ may have up to 4 production authorizations, a DTag which is satisfied (destroyed) when production begins $(d_i)$, kanban which is a standard production authorization $(k_i)$, an MTag for each MTag having $WC_i$ in producer list and $WJ_j$ in consumer list $(_im_j)$, and a CMTag at $MP_1$ MTag loopsize with null producer/consumer work centers (m).

At step 608, when the first item in a standard pack of a part $P_i$ produced at $MP_i$ is consumed by part $P_{i+1}$ produced at $MP_{i+1}$, the kanban $k_i$ is returned to kanban queuing station $K_i$. At step 610, MTags $_im_j$ return to queuing station $M_i$ when part $P_{i+1}$ is released to $MP_{i+2}$. At step 612, CONWIP MTags m are released only when finished good parts containing them are shipped to one or more customers 130a-130n. Once the CONWIP MTags m are released, the method ends. In addition, although, FIG. 6 illustrates one embodiment of a method for providing production control authorization signals in a production environment, various changes may be made to method 600 without departing from the scope of embodiments of the present invention.

Figure 7:
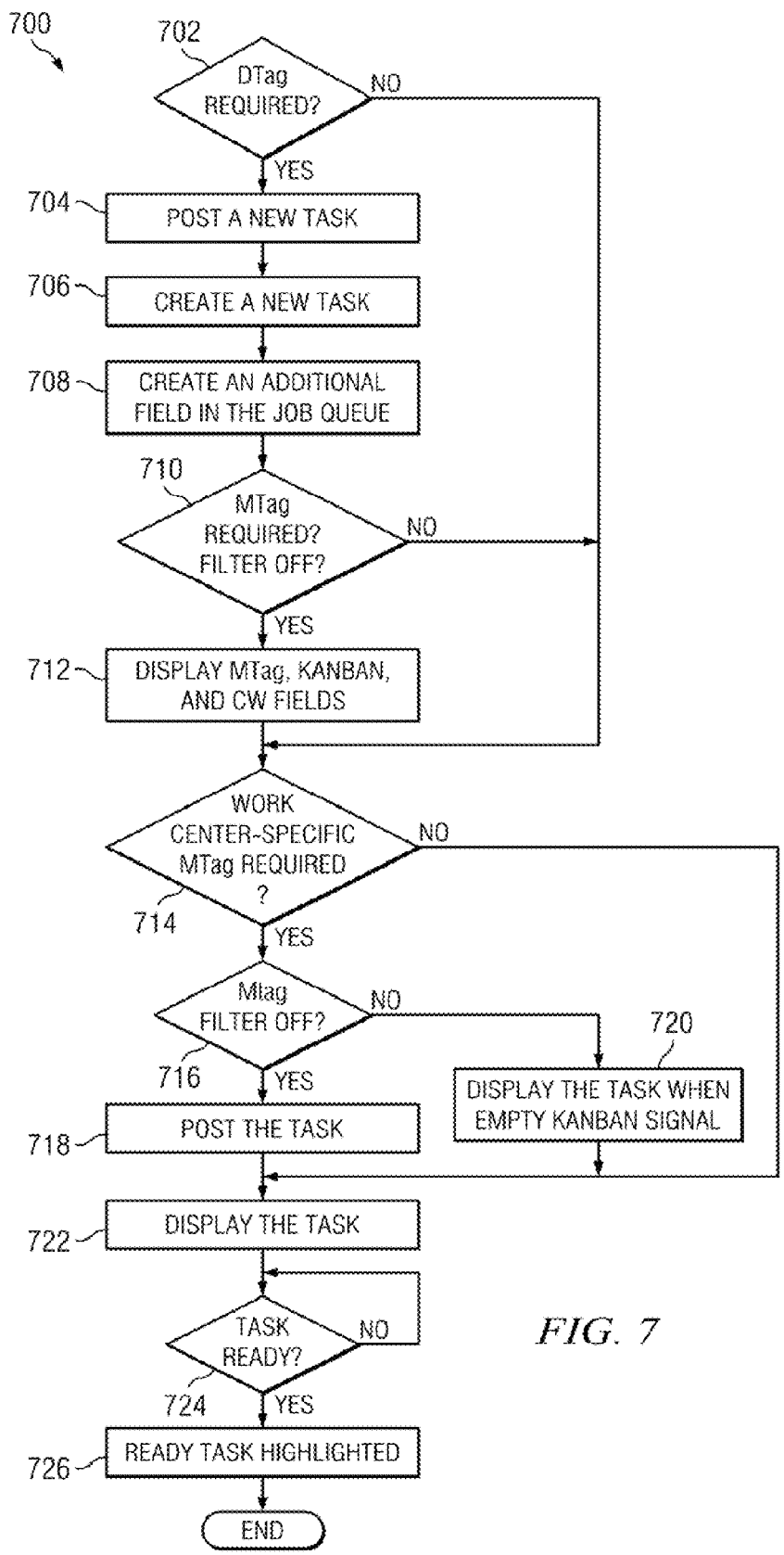
FIG. 7 illustrates an exemplary method for providing production control signals in the production environment of the entity of FIG. 1.

FIG. 7 illustrates an exemplary method 700 for providing production control signals in the production environment of entity 120a. At step 702, production control system 110 determines if a part requires a DTag. If a part requires a DTag, the method proceeds to step 704, otherwise, the method proceeds to step 714. At step 704, production control system 110 posts a new task 411 for that part in operator dashboard interface 400 of the producing work center as soon as a DTag for the part is present in the production control system, which cannot be satisfied by the tasks for that part currently created in job queue 410 (since they may be fully assigned to other DTags). At step 706, production control system 110 creates a task 411, even if no other signal required for authorization is present (MTag, CMTag and/or kanban).

At step 708, production control system 110 displays an additional field in job queue 410 for each additional production authorization signal required by any task 411 in job queue 410. At step 710, production control system 110 determines if any task 411 in work centers 310a-310n requires an MTag and if MTag filter 418 is off (unchecked). If an MTag is required and MTag filter 418 is off, the method proceeds to step 712, otherwise, the method proceeds to step 714. At step 712, production control system 110 displays the MTag (MT) fields 520c and Kanban (KB) fields 520b in operator dashboard interface 400. In addition, if CONWIP is enabled for any part produced at a stage 1 work center 310a then the CONWIP (CW) field 420d may be displayed in operator dashboard interface 400 of work center 310a.

At step 714, production control system 110 determines if the part requires a work center-specific MTag. If a part requires a work center-specific MTag, the method proceeds to step 716, otherwise, the method proceeds to step 722. At step 716, production control system 110 determines if MTag filter 418 is off. If MTag filter 418 is off, the method proceeds to step 718, otherwise, the method proceeds to step 720.

At step 718, production control system 110 posts a task 411 for that part in operator dashboard interface 400 of the producing work center as soon as an empty kanban appears for that part. At step 720, production control system 110 visually displays the task only when there are sufficient MTags and kanban available to authorize production of a standard pack the part, which may be less than trigger quantity.

At step 722, production control system 110 visually displays a task 411 for the part in operator dashboard interface 400 of the producing work center as soon as an empty kanban signal is produced at a downstream work center and the execution of all of the tasks for the part currently open on the work center would not consume all of the empty kanban for that part.

At step 724, production control system 110 determines if tasks 411 are considered ready and if all production authorizations required for task 411 except the CMTag are available in their respective queues at the work center. When tasks 411 are considered ready, the method proceeds to step 726, otherwise, the method continues to determine whether tasks 411 are ready.

At step 726, production control system 110 visually highlights the ready tasks 411, in for example, alternating lighter and darker shades of highlighting color. In addition, or as an alternative, production control system 110 visually highlights the START button 431 when the task is selected so that the task on the work center can be started if the task: does not require the CMTag, or requires the CMTag and the work center has sufficient CMTag available to authorize the task. In addition, production control system 110 visually highlights the CONWIP (CONWIP) button 434 if they require CMTags and there are insufficient CMTags available in the CMTag Queue of the work center. Otherwise the task remains unhighlighted and the task is not able to be selected.

Once ready tasks 411 are selected, the method ends. In addition, although, FIG. 7 illustrates one embodiment of a method for providing production control signals in the production environment, various changes may be made to method 700 without departing from the scope of embodiments of the present invention.

In accordance with the principles of embodiments, the DTag, MTag (and CMTag) and kanban production authorization control signals may be invoked in any of various combinations in order to control production within one or more entities 120a-120n, as needed. As an example only and not by way of limitation, DTags may be utilized in environments where demand is volatile and/or the BOM is complex and/or the amount of time required to produce finished goods from raw materials is significant. Similarly, MTags may be utilized to manage production flow through intermediate capacity constrained work centers to minimize excess inventory and provide for smooth production flow. Similarly, CMTags may be utilized in environments where product mix is volatile and/or the number of component parts used in production is significant. Similarly, kanban may be utilized in environments where production constraints are in the latter stages of production, and/or where production processes and/or component supplies are unreliable and/or in environments where is it impractical to publish a manufacturing plan in an accurate and timely manner.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of providing a production control framework, comprising:
 a computer at one or more work centers of one or more entities that produce a plurality of parts, the computer comprising:
 a user interface comprising one or more tasks for each of the plurality of parts, a job queue comprising an order in which to produce the one or more tasks, a production history comprising a start time and a completion time for each of the one or more tasks, an indication whether each task of the one or more tasks comprises authorization in order to authorize production, one or more control buttons, one or more part-specific demand authorization signals generated when a demand is received at the one or more entities, one or more work center-specific material authorization signals signifying a producing work center and a consuming work center, one or more site-specific material authorization signals, and one or more pull-based production control signals.

2. The system of claim 1, wherein the user interface further comprises a days-of-cover field and a balance-on-hand field associated with each of the one or more tasks.

3. The system of claim 1, further comprising:
 one or more tasks currently authorized by the computer and wherein the user interface indicates at least one task of the one or more tasks that is not currently authorized by the computer comprises authorization in order to produce at least one part of the plurality of parts when the computer receives at least one of the one or more demand authorization signals and the one or more tasks currently authorized by the computer do not satisfy the demand.

4. The system of claim 3, wherein the user interface comprises a work center-specific material authorization signal filter and indicates at least one task of the one or more tasks comprises authorization in order to produce at least one part of the plurality of parts when the at least one of the plurality of parts requires at least one of the one or more work center-specific material authorization signals, the work-center specific material authorization signal filter is deactivated, and at least one of the one or more pull-based production control signals is generated for the at least one of the plurality of parts; or
 when the at least one of the plurality of parts requires at least one of the one or more work center-specific material authorization signals, the work-center specific material authorization signal filter is activated, a number of the one or more work center-specific material authorization signals are available and the number of the one or more work-specific material authorization signals is greater than a predetermined number of work-center specific material authorization signals required for a pack of the plurality of parts, and at least one of the one or more pull-based production control signals is generated for the least one of the plurality of parts.

5. The system of claim 4, wherein the user interface indicates at least one task of the one or more tasks comprises authorization in order to produce at least one part of the plurality of parts when none of the one or more demand authorization signals nor any of the one or more of the work center-specific material authorization signals have been associated with the at least one part of the plurality of parts and when at least one of the one or more pull-based production control signals is generated for the at least one part and completion of all of the one or more currently authorized tasks for the plurality of parts would not use all of the one or more pull-based production control signals generated for the plurality of parts.

6. The system of claim 5, further comprising:
one or more stage one work centers authorizing one or more tasks for one or more initial parts associated with a number of the one or more site-specific material authorization signals at the one or more stage one work centers wherein the plurality of parts comprise approximately an equal number of the one or more initial parts when the number of one or more of the site-specific material authorization signals associated with the one or more initial parts equals a pack quantity multiplied by a trigger quantity.

7. The system of claim 6, wherein the indication comprises a pull-based production control signals field that indicates whether required pull-based production control signals are present to complete the authorization, a work center-specific material authorization signal field that indicates whether required work center-specific material authorization signals are present to complete the authorization, and a site-specific material authorization signal field that indicates a number of site-specific material authorization signals that are needed for authorization of each of the one or more tasks.

8. A method of providing a production control framework, comprising:
displaying, with a user interface on a computer at one or more work centers of one or more entities that produce a plurality of parts, one or more tasks for each of the plurality of parts, a job queue comprising an order in which to produce the one or more tasks, a production history comprising a start time and a completion time for each of the one or more tasks, an indication whether each task of the one or more tasks comprises authorization in order to authorize production, one or more control buttons, one or more part-specific demand authorization signals generated when a demand is received at the one or more entities, one or more work center-specific material authorization signals signifying a producing work center and a consuming work center, one or more site-specific material authorization signals, and one or more pull-based production control signals; and
recording, in a storage medium of the computer, the start time and the completion time of each of the one or more tasks.

9. The method of claim 8, further comprising displaying, on the user interface, a days of cover and a balance on hand associated with each of the one or more tasks.

10. The method of claim 8, wherein at least one of the one or more tasks is currently authorized by the computer and the user interface indicates at least one task of the one or more tasks that is not currently authorized by the computer comprises authorization in order to produce at least one part of the plurality of parts when the computer receives at least one of the one or more demand authorization signals and the one or more tasks currently authorized by the computer do not satisfy the demand.

11. The method of claim 10, wherein the user interface comprises a work center-specific material authorization signal filter and indicates at least one task of the one or more tasks comprises authorization in order to produce at least one part of the plurality of parts when the at least one of the plurality of parts requires at least one of the one or more work center-specific material authorization signals, the work-center specific material authorization signal filter is deactivated, and at least one of the one or more pull-based production control signals is generated for the at least one of the plurality of parts; or
when the at least one of the plurality of parts requires at least one of the one or more work center-specific material authorization signals, the work-center specific material authorization signal filter is activated, a number of the one or more work center-specific material authorization signals are available and the number of the one or more work-specific material authorization signals is greater than a predetermined number of work-center specific material authorization signals required for a pack of the plurality of parts, and at least one of the one or more pull-based production control signals is generated for the least one of the plurality of parts.

12. The method of claim 11, wherein the user interface indicates at least one task of the one or more tasks comprises authorization in order to produce at least one part of the plurality of parts when none of the one or more demand authorization signals nor any of the one or more of the work center-specific material authorization signals have been associated with the at least one part of the plurality of parts and when at least one of the one or more pull-based production control signals is generated for the at least one part and completion of all of the one or more currently authorized tasks for the plurality of parts would not use all of the one or more pull-based production control signals generated for the plurality of parts.

13. The method of claim 12, further comprising:
authorizing by the computer one or more tasks for one or more initial parts associated with a number of the one or more site-specific material authorization signals at one or more stage one work centers wherein the plurality of parts comprise approximately an equal number of the one or more initial parts when the number of one or more of the site-specific material authorization signals associated with the one or more initial parts equals a pack quantity multiplied by a trigger quantity.

14. The method of claim 13, wherein the indication comprises a pull-based production control signals field that indicates whether required pull-based production control signals are present to complete the authorization, a work center-specific material authorization signal field that indicates whether required work center-specific material authorization signals are present to complete the authorization, and a site-specific material authorization signal field that indicates a number of site-specific material authorization signals that are needed for authorization of each of the one or more tasks.

15. A non-transitory computer-readable medium embodied with software for providing a production control framework, the software when executed using one or more computers is configured to:
display one or more tasks for each of a plurality of parts, a job queue comprising an order in which to produce one or more tasks, a production history comprising a start time and a completion time for each of the one or more tasks, an indication whether each task of the one or more tasks comprises authorization in order to authorize production, one or more control buttons, one or more part-specific demand authorization signals generated when a demand is received at the one or more entities that produce the plurality of parts, one or more work center-specific material authorization signals signifying a producing work center and a consuming work center, one or more site-specific material authorization signals, and one or more pull-based production control signals; and record the start time and the completion time of each of the one or more tasks.

16. The non-transitory computer-readable medium of claim 15, wherein the software if further configured to:
display a days of cover and a balance on hand associated with each of the one or more tasks.

17. The non-transitory computer-readable medium of claim 15, wherein the software is further configured to:
indicate at least one task of the one or more tasks in order to produce at least one part of the plurality of parts when at least one of the one or more demand authorization signals is received.

18. The non-transitory computer-readable medium of claim 17, wherein the software is further configured to:
indicate at least one task of the one or more tasks comprises authorization in order to produce at least one part of the plurality of parts when the at least one of the plurality of parts requires at least one of the one or more work center-specific material authorization signals, the work-center specific material authorization signal filter is deactivated, and at least one of the one or more pull-based production control signals is generated for the at least one of the plurality of parts; or
when the at least one of the plurality of parts requires at least one of the one or more work center-specific material authorization signals, the work-center specific material authorization signal filter is activated, a number of the one or more work center-specific material authorization signals are available and the number of the one or more work-specific material authorization signals is greater than a predetermined number of work-center specific material authorization signals required for a pack of the plurality of parts, and at least one of the one or more pull-based production control signals is generated for the least one of the plurality of parts.

19. The non-transitory computer-readable medium of claim 18, wherein the software is further configured to:
indicate at least one task of the one or more tasks comprises authorization in order to produce at least one part of the plurality of parts when none of the one or more demand authorization signals nor any of the one or more of the work center-specific material authorization signals have been associated with the at least one part of the plurality of parts and when at least one of the one or more pull-based production control signals is generated for the at least one part and completion of all of the one or more currently authorized tasks for the plurality of parts would not use all of the one or more pull-based production control signals generated for the plurality of parts.

20. The non-transitory computer-readable medium of claim 19, wherein the software is further configured to:
authorize one or more tasks for one or more initial parts associated with a number of the one or more site-specific material authorization signals at one or more stage one work centers wherein the plurality of parts comprise approximately an equal number of the one or more initial parts when the number of one or more of the site-specific material authorization signals associated with the one or more initial parts equals a pack quantity multiplied by a trigger quantity.

* * * * *

UNITED STATES PATENT AND TRADEMARK OFFICE
CERTIFICATE OF CORRECTION

PATENT NO. : 8,965,539 B2
APPLICATION NO. : 12/565348
DATED : February 24, 2015
INVENTOR(S) : Timothy R. Hayes et al.

Page 1 of 1

It is certified that error appears in the above-identified patent and that said Letters Patent is hereby corrected as shown below:

In the Specification

Column 20 lines 20-29 should read

At step 606, Synchronization Station $U_i$, shown in FIGURE 3 coordinates the timely aggregation of multiple production authorization signals to ensure that all authorizations required by task 411 are present before production is initiated. Each $U_i$ may have up to 4 production authorizations, a DTag which is satisfied (destroyed) when production begins ($d_i$), kanban which is a standard production authorization ($k_i$), an MTag for each MTag having $WC_i$ in producer list and $WC_j$ in consumer list ($_im_j$), and a CMTag at $MP_1$ MTag loopsize with null producer/consumer work centers (m).

Signed and Sealed this
Sixteenth Day of June, 2015

Michelle K. Lee
*Director of the United States Patent and Trademark Office*